(12) United States Patent
Modi

(10) Patent No.: US 11,356,823 B1
(45) Date of Patent: *Jun. 7, 2022

(54) SYSTEM AND METHOD FOR MUTUALLY SECURED INFORMATION EXCHANGE BETWEEN POSSESSORS OF AUTOMOBILES

(71) Applicant: United Services Automobile Association (USAA), San Antonio, TX (US)

(72) Inventor: Nilay Yalesh Modi, McKinney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,515

(22) Filed: May 17, 2021

Related U.S. Application Data

(63) Continuation of application No. 16/869,306, filed on May 7, 2020, now Pat. No. 11,012,836, which is a continuation of application No. 15/950,839, filed on Apr. 11, 2018, now Pat. No. 10,681,022.

(60) Provisional application No. 62/484,201, filed on Apr. 11, 2017.

(51) Int. Cl.
| | |
|---|---|
| *H04L 29/06* | (2006.01) |
| *H04W 4/46* | (2018.01) |
| *B60R 21/0136* | (2006.01) |
| *G06Q 10/10* | (2012.01) |
| *H04L 9/40* | (2022.01) |
| *H04W 12/63* | (2021.01) |

(52) U.S. Cl.
CPC ........... *H04W 4/46* (2018.02); *B60R 21/0136* (2013.01); *G06Q 10/10* (2013.01); *H04L 63/0492* (2013.01); *H04W 12/63* (2021.01)

(58) Field of Classification Search
CPC . H04L 63/0492; G06Q 40/08; B60R 21/0136; H04W 4/46
See application file for complete search history.

(56) References Cited

U.S. PATENT DOCUMENTS

| | | | | |
|---|---|---|---|---|
| 7,840,338 | B2 * | 11/2010 | Paolacci | B61L 27/0038 |
| | | | | 701/117 |
| 11,012,836 | B1 * | 5/2021 | Modi | H04W 4/023 |

(Continued)

*Primary Examiner* — Kim T Nguyen
(74) *Attorney, Agent, or Firm* — Fletcher Yoder, P.C.

(57) ABSTRACT

A system configured to enable mutually secured information exchange between a first user of a first automobile and a second user of a second automobile includes a first device associated with the first automobile, where the first device is configured to provide a first data set indicative of first information relating to the first automobile. The system includes a second device associated with the second automobile, where the second device is configured to provide a second data set indicative of second information relating to the second automobile. The system includes officiating componentry configured to, based on a determination that the first data set and the second data set meet a threshold data requirement, transmit a third data set indicative of third information relating to the first automobile to the second device, and a fourth data set indicative of fourth information relating to the second automobile to the first device.

20 Claims, 5 Drawing Sheets

(56) References Cited

U.S. PATENT DOCUMENTS

2015/0120871 A1* 4/2015 Li .......................... H04L 67/22
　　　　　　　　　　　　　　　　　　　　　　709/217
2017/0129466 A1* 5/2017 Okubo ..................... B60T 7/22

* cited by examiner

SYSTEM AND METHOD FOR MUTUALLY SECURED INFORMATION EXCHANGE BETWEEN POSSESSORS OF AUTOMOBILES

CROSS-REFERENCE TO RELATED APPLICATIONS

This application is a continuation of U.S. patent application Ser. No. 16/869,306, filed May 7, 2020, entitled "SYSTEM AND METHOD FOR MUTUALLY SECURED INFORMATION EXCHANGE BETWEEN POSSESSORS OF AUTOMOBILES," which is a continuation of U.S. patent application Ser. No. 15/950,839, filed Apr. 11, 2018, entitled "SYSTEM AND METHOD FOR MUTUALLY SECURED INFORMATION EXCHANGE BETWEEN POSSESSORS OF AUTOMOBILES," which claims priority to and the benefit of U.S. Provisional Application No. 62/484,201, filed Apr. 11, 2017, entitled "SYSTEM AND METHOD FOR MUTUALLY SECURED INFORMATION EXCHANGE BETWEEN POSSESSORS OF AUTOMOBILES," which are each hereby incorporated by reference in their entirety.

BACKGROUND

The present disclosure relates generally to automobile traffic and collision management. More specifically, the present disclosure relates to a system and method for mutually secured information exchange between possessors (e.g., owners, renters, lessees, or drivers) of automobiles, such as parties to an automobile collision.

Modern travel (e.g., short, middle, and long distances), especially in automobiles, often involves unexpected delays resulting from unpredictable traffic patterns. For example, traffic delays are often at least partially dependent on automobile collisions, and corresponding automobile traffic and collision management. Those stuck in a traffic jam may prefer that automobile collisions be handled quickly. On the other hand, parties to an automobile collision may prefer that automobile collisions be managed comprehensively. Unfortunately, automobile collisions often involve disputes between parties to the collision, incomplete insurance information from the parties to the collision, involvement of local traffic police, and other delays and inefficiencies. Accordingly, there is a need for enhanced automobile collision and traffic management that is both more efficient and more comprehensive.

SUMMARY OF THE INVENTION

In accordance with an embodiment of the present disclosure, a system is configured to enable mutually secured information exchange between a first user of a first automobile and a second user of a second automobile. The system includes a first information exchange device associated with the first automobile, where the first information exchange device is configured to provide a first data set indicative of first information relating to the first automobile. The system includes a second information exchange device associated with the second automobile user, where the second information exchange device is configured to provide a second data set indicative of second information relating to the second automobile. The system also includes one or more officiating components configured to, based on a determination that the first data set and the second data set meet a threshold data requirement, transmit a third data set indicative of third information relating to the first automobile to the second information exchange device, and a fourth data set indicative of fourth information relating to the second automobile to the first information exchange device.

In accordance with another embodiment of the present disclosure, a system is configured to enable mutually secured information exchange relating to an automobile collision. The system includes an officiating component configured to receive, in response to a detection of the automobile collision, a first data set indicative of first information relating to a first automobile and a second data set indicative of second information relating to a second automobile. The officiating component is also configured to approve transmission, in response to determining that the first data set and the second data set meet a threshold data requirement, of a third data set indicative of third information relating to the first automobile and a fourth data set indicative of fourth information relating to the second automobile.

In accordance with still another embodiment of the present disclosure, a tangible, non-transitory, machine-readable medium, includes machine-readable instructions that, when executed by one or more processors, cause the one or more processors to compare, in response to a detection of an automobile collision, a first data set indicative of first information relating to a first automobile with a threshold data requirement. The machine-readable instructions, when executed by the one or more processors, also cause the one or more processors to compare, in response to the detection of the automobile collision, a second data set indicative of second information relating to a second automobile with the threshold data requirement. The machine-readable instructions, when executed by the one or more processors, also cause the one or more processors to approve transmission, in response to determining that both the first data set and the second data set exceed the threshold data requirement, of a third data set indicative of third information relating to the first automobile.

DRAWINGS

These and other features, aspects, and advantages of the present disclosure will become better understood when the following detailed description is read with reference to the accompanying drawings in which like characters represent like parts throughout the drawings, wherein.

Figure 1:
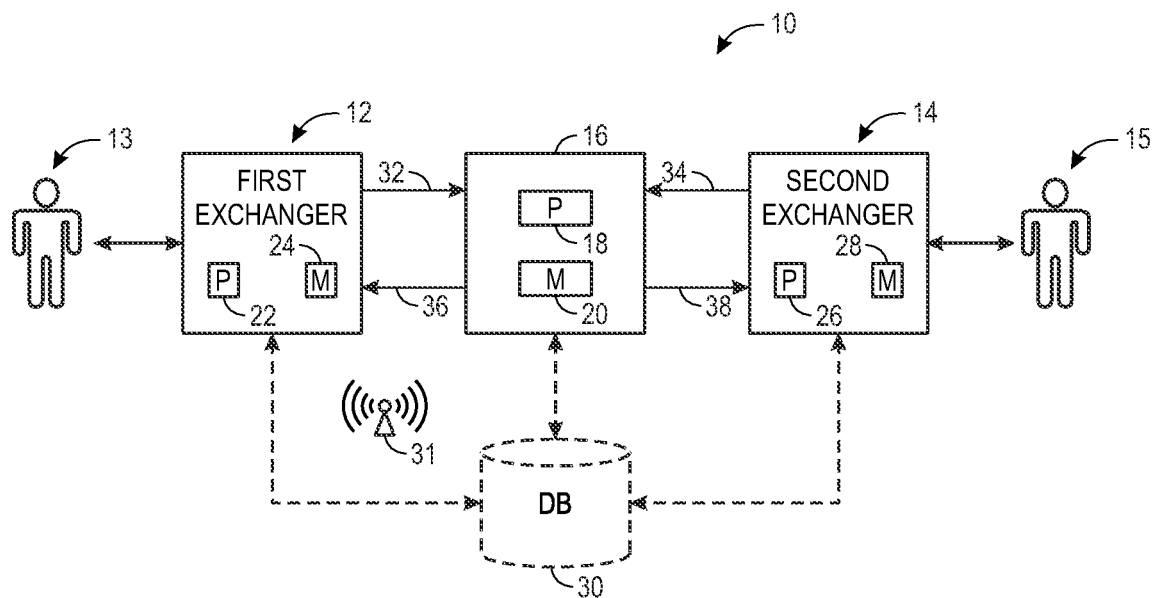
FIG. 1 is a schematic illustration of an embodiment of an automobile collision management system, in accordance with an aspect of the present disclosure.
Figure 2:
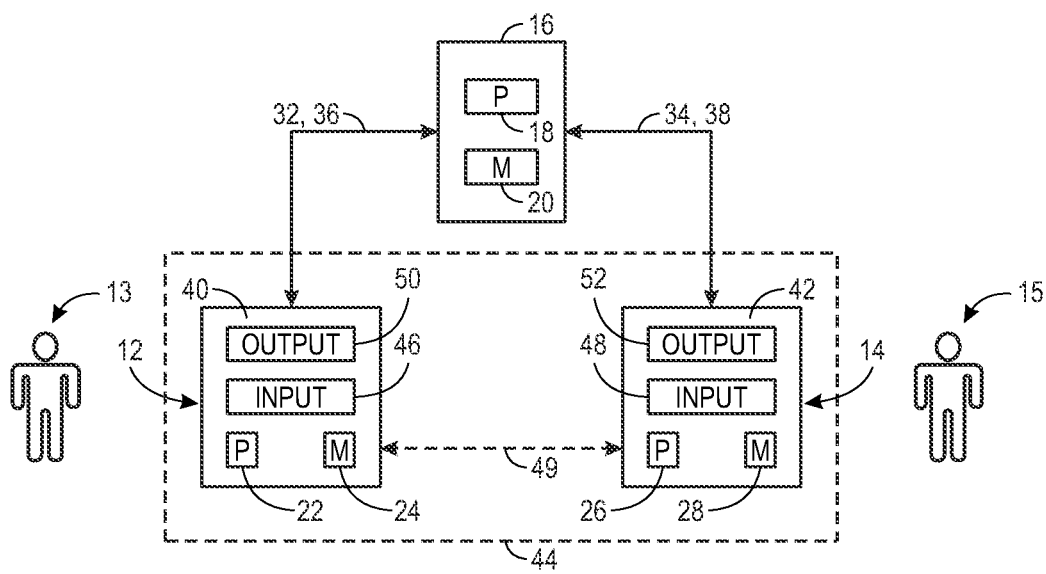
FIG. 2 is a schematic illustration of an embodiment of the automobile collision management system of FIG. 1, in accordance with an aspect of the present disclosure.
Figure 3:
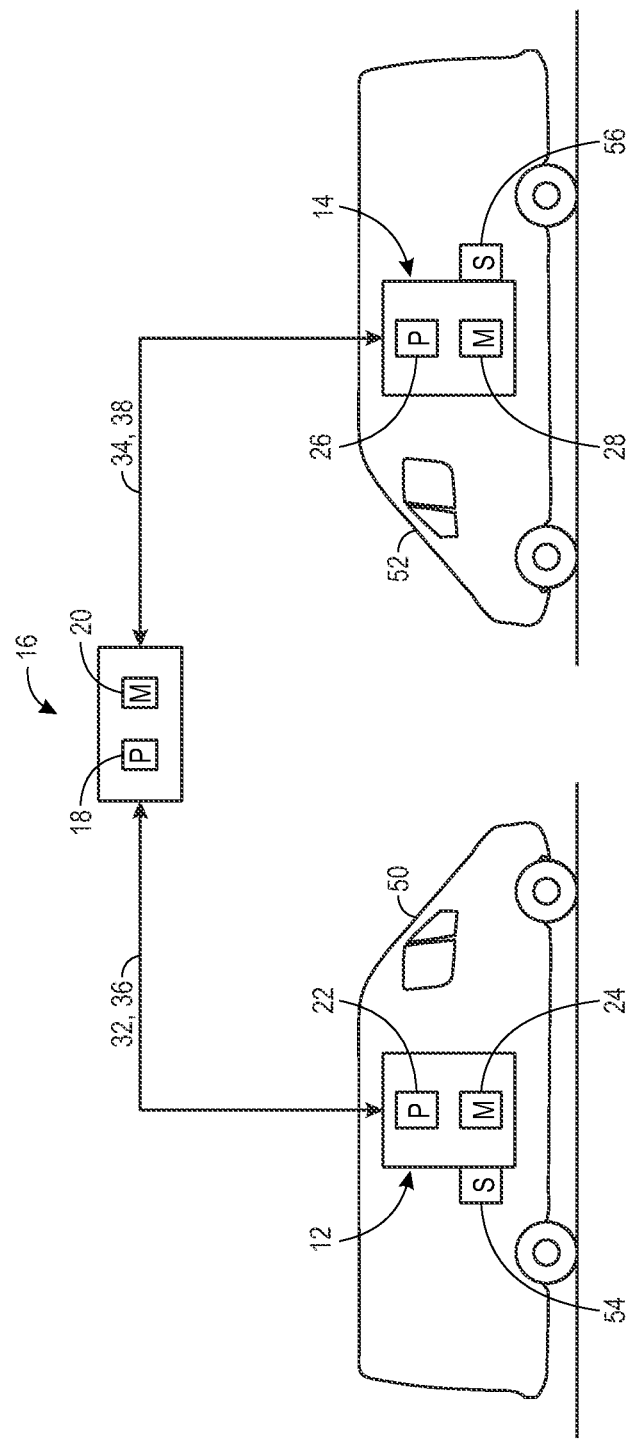
FIG. 3 is a schematic illustration of an embodiment of the automobile collision management system of FIG. 1, in accordance with an aspect of the present disclosure.
Figure 4:
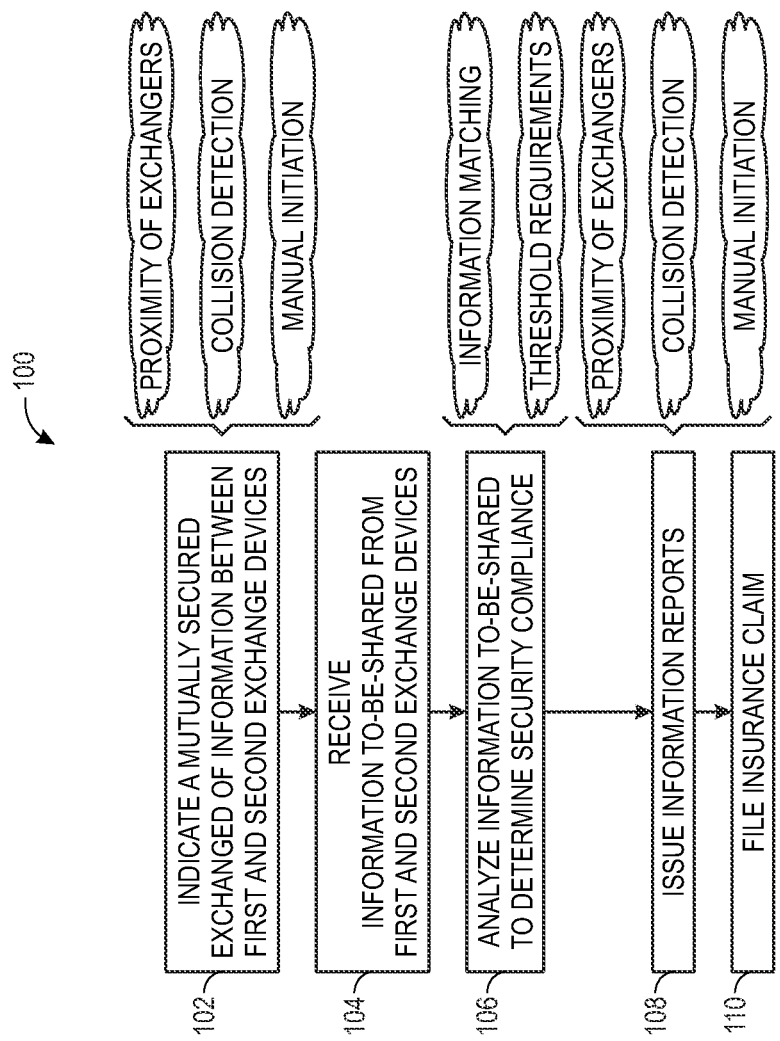
FIG. 4 is a process flow diagram illustrating an embodiment of a method of securely exchanging information following an automobile collision, in accordance with an aspect of the present disclosure.
Figure 5:
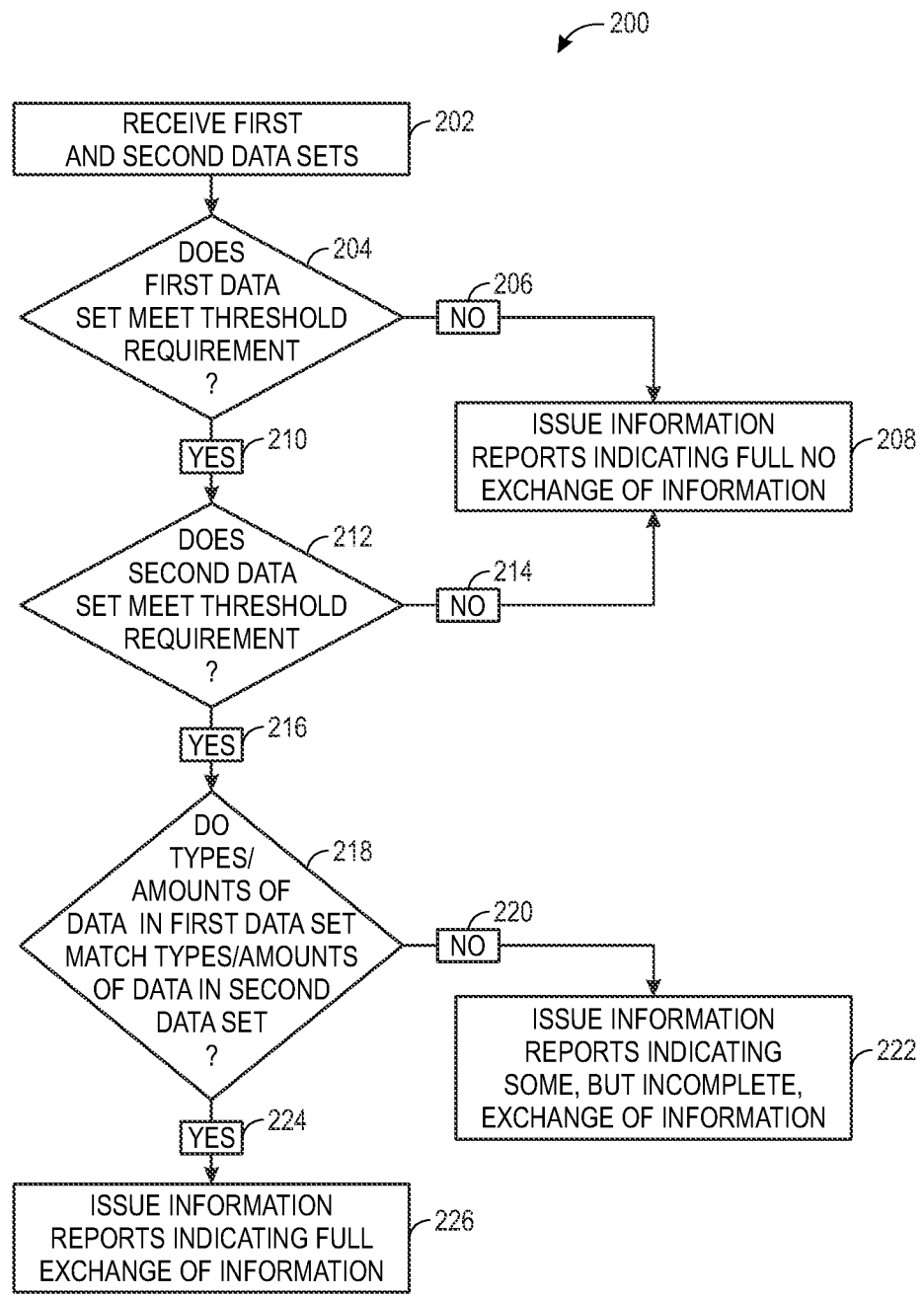
Figure 6:
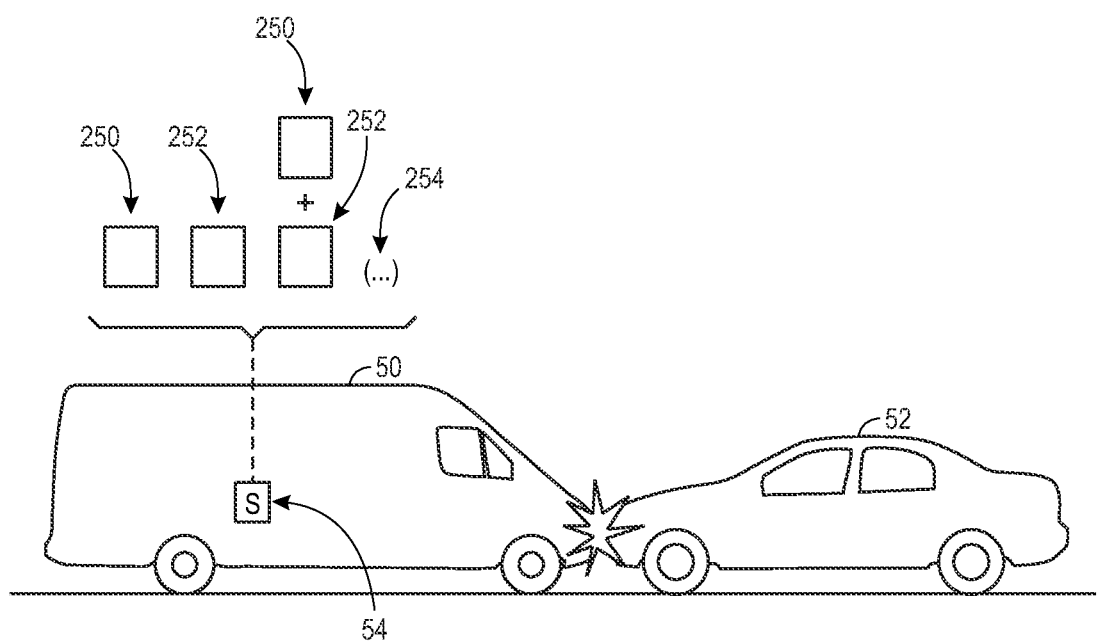

FIG. 5 is a flow chart illustrating an embodiment of a process of analyzing information for purposes of securely exchanging information following an automobile collision, in accordance with an aspect of the present disclosure; and FIG. 6 is a schematic diagram illustrating various embodiments of vehicle collision detection parts or assemblies suitable for use in the systems of FIGS. 1-3 and processes of FIGS. 4 and 5, in accordance with an aspect of the present disclosure.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed toward automobile traffic and collision management. More specifically, the present disclosure relates to a system and method for secured information exchange between possessors (e.g., owners, renters, lessees, or drivers) of automobiles, such as parties to an automobile collision, as described in detail below.

Modern travel (e.g., short, middle, and long distances), especially in automobiles, often involves unexpected delays resulting from unpredictable traffic patterns. For example, traffic delays are often at least partially dependent on automobile collisions, and corresponding automobile traffic and collision management. Those stuck in a traffic jam may prefer that automobile collisions be handled quickly. On the other hand, parties to an automobile collision may prefer that automobile collisions be managed comprehensively. Because automobile collisions often involve uncertainly, disputes between parties to the collision, incomplete insurance information from the parties to the collision, involvement of local traffic police, and other delays and inefficiencies, there is a need for improved traffic and automobile collision management.

In accordance with an aspect of the present disclosure, a traffic management system may include a first exchanger or user device (e.g., of a first user of the presently disclosed system), a second exchanger or user device (e.g., of a second user of the presently disclosed system), and at least one officiating component (e.g., officiating device). The first and second exchangers or user devices may be portable electronic devices, such as cellular phones. Additionally or alternatively, the first and second exchangers or user devices may be installed in (or integral with) corresponding first and second user vehicles. A memory of the first exchanger or user device may be populated with certain information associated with the first user, and a memory of the second exchanger or user device may be populated with certain information associated with the second user. Alternatively, a separate database (e.g., server or cloud-based storage) may store the information of the first user and the second user, where the database is accessible (e.g., via the Internet) by the first exchanger or user device and the second exchanger or user device. The types of information populating the memories of each device (or of the database) may include a name of the corresponding user, a birthdate of the corresponding user, contact information of the corresponding user, a driver's license number of the corresponding user, an automobile insurance policy number of the corresponding user, an automobile insurance company corresponding with the policy number, effective and expiration dates corresponding with the policy number, a make, model, and/or year of the user's vehicle, an identification number of the user's vehicle, or other automobile insurance-related information, or any combination thereof. It should be noted that, in some embodiments, the information populating the memories of each device (or of the database) must be authenticated to ensure that, if an information exchange is to take place, the information being exchanged is accurate. For example, an insurance company may authenticate the information prior to any proposed information exchange.

Following an automobile collision between the first vehicle and the second vehicle (or because of some other reason associated with the need to exchange automobile insurance-related information), the first user and the second user may initiate a mutually secured information exchange via the presently disclosed system. For example, the first user and the second user may attempt a mutually secured information exchange in which the information to-be-shared by the first user is analyzed (e.g., for completeness) by an officiating component, the information to-be-shared by the second user is analyzed (e.g. for completeness) by the officiating component, and the mutually secured information exchange is only completed based on approval by the officiating component (or device). In some embodiments, the mutually secured information exchange is initiated by facilitating a proximity between the first exchanger or user device and the second exchanger or user device. Additionally or alternatively, the mutually secured information exchange may be initiated by way of mutual assent between the first and second user, e.g., manifested through their use of the corresponding first and second exchangers or user devices, respectively. Further still, in embodiments where the first exchanger or user device is installed in (or integral with) the first vehicle and the second exchanger or user device is installed in (or integral with) the second vehicle, the mutually secured information exchange may be automatically initiated upon a collision between the first vehicle and the second vehicle. Indeed, sensors (e.g., collision detectors) in each of the first and second vehicles may detect the collision, and communicate to the first and second devices, respectively, that the collision has occurred. After receipt of the sensor feedback, the first and second devices may thereafter attempt to initiate the mutually secured information exchange.

The officiating component (or device) may approve the mutually secured information exchange if the information to-be-shared by the first user meets certain threshold requirements, if the information to-be-shared by the second user meets certain threshold requirements, if the types of information to-be-shared provided by the first and second exchangers matches, or a combination thereof. Depending on the embodiment, the officiating component may approve the mutually secured information exchange for only a portion of the information to-be-shared by the first exchanger, the second exchanger, or both. Threshold requirements differ from information matching requirements insomuch as threshold requirements seek to ensure that both the first exchanger and the second exchanger share certain types of information, whereas information matching only requires that the first and second exchangers share the same types of information, regardless of whether the information is comprehensive enough to meet the threshold requirement of the officiating component. As suggested above, the mutually secured information exchange may be completed in full if approved by the officiating component or device, may be partially completed if approved by the officiating component or device, or may be canceled if determined by the officiating component or device. Officiating component decisions will be described in detail below, with reference to the figures.

By facilitating the mutually secured information exchange described above, the disclosed systems and methods reduce uncertainty resulting from automobile accidents or collisions, and reduce the need for law enforcement involvement. Further, by facilitating the mutually secured information exchange described above, the disclosed systems and methods enhance accuracy of information exchange, and enhance efficiency and speed of information exchange. It should also be noted that, in some embodiments, the disclosed automobile collision management systems and methods may facilitate automatic filing of insurance claims (e.g., if approved by the officiating component). These advantages will be described in detail below with reference to the figures.

FIG. 1 is a schematic illustration of an embodiment of an automobile collision management system 10. In the illustrated embodiment, the system 10 includes a first exchanger 12 (e.g., a first user device) of a first user 13, a second exchanger 14 (e.g., a second user device) of a second user 15, and an officiating component 16 (e.g., officiating device). The officiating component 16 includes a processor 18 and a memory 20, where the memory 20 is configured to store instructions that, when executed by the processor 18, cause the officiating component 16 to perform certain acts. It should be noted that, in certain embodiments, the officiating component may be remotely located, such as in a remote database. The first exchanger 12 also includes a processor 22 and a memory 24, and the second exchanger 14 also includes a processor 26 and a memory 28.

As described above, the first user 13 and the second user 15 may be automobile owners, renters, lessees, or drivers involved in an automobile accident (e.g., collision). The first user 13 and the second user 15 may desire to exchange certain information (e.g., identification and automobile insurance-related information). The first exchanger 12 of the first user 13 may include certain information (e.g., identification and automobile insurance-related information) stored to the memory 24 of the first exchanger 12, and the second exchanger 14 of the second user 15 may include certain information (e.g., identification and automobile insurance-related information) stored to the memory 28 of the second exchanger 14. In some embodiments, the information may be stored to a separate database 30, which is accessible by the first and second exchangers 12, 14 (e.g., via an Internet system 31 communicatively coupling the database 30 with the first and/or second exchangers 12, 14). For example, the first exchanger 12 may access information from the database 30 corresponding with the first user 13, and the second exchanger 14 may access information from the database 30 corresponding with the second user 15. Further, the officiating component 16 may communicatively couple to the exchangers 12, 14 via the Internet or some other network protocol, such as Bluetooth.

The first and second exchangers 12, 14 may initiate a mutually secured information exchange between the first and second exchangers 12, 14 automatically, or in response to permission input from the corresponding users 13, 15, or a combination thereof. For example, the mutually secured information exchange may be initiated by the first and second user 13, 15 manually utilizing the first and second exchangers 12, 14 (or input components thereof). Additionally or alternatively, the mutually secured information exchange may be initiated automatically by the first and second exchangers 12, 14 in response to certain stimuli (e.g., an automobile collision, or by coming within a certain proximity of one another). More specific examples of the first and second exchangers 12, 14, and initiation of the mutually secured exchange of information, will be described in detail in later figures.

Upon initiation of the mutually secured exchange of information, the first exchanger 12 may send information to-be-shared 32 (e.g., identification and automobile insurance-related information) corresponding with the first user 13 (or vehicle thereof) to the officiating component 16. Likewise, the second exchanger 14 may send information to-be-shared 34 (e.g., identification and automobile insurance-related information) corresponding with the second user 15 (or vehicle thereof) to the officiating component 16. The officiating component 16 may analyze the information to-be-shared 32 received from the first exchanger 12, in addition to the information to-be-shared 34 received from the second exchanger 14. As previously described, and as will be described in detail with reference to later figures, the officiating component 16 may analyze the received information to-be-shared 32, 34 for completeness, accuracy, matching, and/or other parameters. Following analysis, the officiating component 16 may send an information report 36 to the first exchanger 12, and an information report 38 to the second exchanger 14. In some embodiments, the information reports 36, 38 may be identical. In other embodiments, the information report 36 sent to the first exchanger 12 may only include some or all of the information to-be-shared 34 from the second exchanger 14, and the information report 38 sent to the second exchanger 14 may only include some or all of the information to-be-shared 32 from the first exchanger 12.

Depending on the analysis of the information to-be-shared 32, 34, the information reports 36, 38 may vary. For example, if the officiating component 16 includes a threshold requirement requiring certain base-level types of information, the information reports 36, 38 may include the base-level types of information (e.g., assuming the information to-be-shared 32, 34 meets the officiating component's 16 criteria), or the information reports 36, 38 may indicate that the mutually secured information exchange was canceled (e.g., due to insufficient information in the information to-be-shared 32 from the first exchanger 12, the information to-be-shared 34 from the second exchanger 14, or both). It should be noted that the base-level types of information may not be the only criteria, or may not be included in the criteria, analyzed by the officiating component 16. For example, in some embodiments, the officiating component 16 may require that the types of information provided by the first exchanger 12 match the types of information provided by the second exchanger 14, but without including a threshold requirement of certain types of information. In some embodiments, the officiating component may include a threshold requirement and an information matching scheme, as will be described in detail with reference to later figures. As previously described, the types of information that may be provided may include a name of the corresponding user, a birthdate of the corresponding user, contact information of the corresponding user, a driver's license number of the corresponding user, an automobile insurance policy number of the corresponding user, an automobile insurance company corresponding with the policy number, effective and expiration dates corresponding with the policy number, a make, model, and/or year of the user's vehicle, an identification number of the user's vehicle, or other automobile insurance-related information, or any combination thereof. It should be noted that, in some embodiments, the information included in the memories of each exchanger 12, 14 (or of the database 30 accessed thereby) must be authenticated to ensure that, if an information exchange is to take place, the information being exchanged is accurate. For example, an insurance company (or an owner of the database 30 or officiating component 16, or some other neutral third party) may authenticate the information prior to any proposed information exchange. Alternatively, an algorithm included on the first exchanger 12, the second exchanger 14, or both may operate as the officiating component 16 in lieu of a separate officiating device. That is, in certain embodiments, the authentication may be conducted by the exchangers 12, 14 themselves, as opposed to a separate officiating device.

By facilitating the mutually secured information exchange described above, the system 10 may reduce uncertainty resulting from automobile accidents or collisions, and may reduce the need for law enforcement involvement. Further, by facilitating the mutually secured information exchange described above, the disclosed system 10 may enhance accuracy of information exchange, and may enhance efficiency and speed of information exchange.

Further, in some embodiments, a successful exchange of information between the first and second exchangers 12, 14 may facilitate at least partially automatic filing (or initiate a filing) of an insurance claim. For example, once the information is exchanged, either of the users 13, 15 may utilize the information to file an insurance claim, or either of the exchangers 12, 14 (or officiating component 16) may automatically file (or prepare to file) an insurance claim with the exchanged information. Indeed, in some embodiments, an insurance claim may be automatically initiated (e.g., kick-started) with the exchanged information, leaving the rest of the information to be provided by, e.g., the user.

FIG. 2 is a schematic illustration of an embodiment of the automobile collision management system 10 of FIG. 1, where the first exchanger 12 includes a first portable electronic device 40 (e.g., cellular phone), and the second exchanger 14 includes a second portable electronic device 42. In the illustrated embodiment, the previously described mutually secured information exchange may be initiated based at least in part on a proximity of the first and second portable electronic devices 40, 42. For example, if the first and second portable electronic devices 40, 42 are both disposed within a proximity zone 44, exchange may be permissible. Further, each of the portable electronic devices 40, 42 may include input features 46, 48 (e.g., keyboard or screen) and output features 50, 52 (e.g., speaker or screen), respectively. The first user 13 may utilize the input feature 46 of the first portable electronic device 40 to initiate the exchange, and the second user 15 may utilize the input feature 48 of the second portable electronic device 42 to initiate the exchange. Once both portable electronic devices 40, 42 are both within the proximity zone 44, and both users 13, 15 have approved initiation, the mutually secured information exchange may be initiated. It should be noted that the proximity zone 44 may be determined at least in part by the portable electronic devices 40, 42 themselves. For example, the proximity zone 44 may involve the use of Bluetooth or similar protocols. Further, in some embodiments, the proximity zone 44 may not be included, and/or the exchange may be initiated only by manual use of the portable electronic devices 40, 42 by the users 13, 15, respectively.

It should also be noted that the officiating component 16 may be incorporated in the first portable electronic device 40, the second portable electronic device 42, or both. Indeed, each of the first and second portable electronic devices 40, 42 may include a separate portion (e.g., circuitry) of the officiating component which, for example, is part of a cell phone application that facilitates the disclosed mutually secured information exchange. In other words, in some embodiments, the first and second exchangers 12, 14 may communicate directly with one another, as indicated by dashed line 49, and the processors 22, 28 of the first and second exchangers 12, 14, respectively, may encompass corresponding portions (e.g., circuitry) of the officiating component. In embodiments where each of the first and second exchangers 12, 14 includes its own officiating component (e.g., encompassed by the corresponding processors 22, 26), one operating mode might require that the officiating component of the first exchanger 12 approve of the information to-be-shared 34 from the second exchanger 14, and the officiating component of the second exchanger 14 approve of the information to-be-shared 32 from the first exchanger 12, before completing the mutually secured information exchange. In other words, approval by both officiating components might be required before the exchange is completed for viewing by the users of the first and second exchangers 12, 14. However, in those embodiments, the first and second exchangers 12, 14 may include firewalls such that the information to-be-shared 34 by the second exchanger 14 is not accessible for viewing purposes by the first exchanger 12, and vice versa. In other words, the first exchanger 12 may, during the initiation and analyzation phases, access the information to-be-shared 34 from the second exchanger 14 for officiating purposes only, until both officiating components approve of the exchange. Likewise, the second exchanger 14 may, during the initiation and analyzation phases, access the information to-be-shared 34 from the first exchanger 12 for officiating purposes only, until both officiating components approve of an exchange. The two portions of the officiating component in such an embodiment may communicate to ensure compatibility between any threshold requirements, information matching requirements, or other requirements.

FIG. 3 is a schematic illustration of an embodiment of the automobile collision management system 10 of FIG. 1, where the first exchanger 12 is integral with a first vehicle 50 (e.g., of the first user), and the second exchanger 14 is integral with a second vehicle 52 (e.g., of the second user). FIG. 3 illustrates another example involving initiation of the mutually secured information exchange. In the illustrated embodiment, the mutually secured information exchange may be initiated directly upon impact between the first and second vehicles 50, 52. For example, the first vehicle 50 may include a collision sensor 54, and the second vehicle may include a collision sensor 56. The first exchanger 12 integral with the first vehicle 50 may be included in a CPU of the first vehicle 50, and the second exchanger 14 integral with the second vehicle 52 may be included in a CPU of the second vehicle 52. If the collision sensor 54 of the first vehicle 50 detects a collision, the second collision sensor 56 of the second vehicle 52 detects the collision, or both, the previously described mutually secured information exchange may be initiated. The collision sensors 54, 56 may independently operate to detect a sudden or unexpected jolt (e.g., deceleration) of the corresponding vehicles 50, 52 during the collision, and/or to detect proximities of the corresponding vehicles 50, 52. As previously described, the first and second exchangers 12, 14 may be equipped with a Bluetooth or similar protocol to enable communication therebetween, such that the first and second exchangers 12, 14 can detect each other following detection (e.g., by the collision sensors 54, 56) of the collision. In other words, once the sensors 54, 56 detect the collision, the first and second exchangers 12, 14 may activate their corresponding Bluetooth circuitry to detect one another, and to initiate the mutually secured information exchange as described above and below.

FIG. 4 is a process flow diagram illustrating an embodiment of a method 100 of securely exchanging information following an automobile collision, in accordance with an aspect of the present disclosure. In the illustrated embodiment, the method 100 includes initiating (block 102) a mutually secured exchange of information between a first exchange device (e.g., of a first user) and a second exchange device (e.g., of a second user). For example, as previously described, the initiation step (block 102) may involve ensuring a proximity of first and second exchangers corresponding with the first and second users. Additionally or alternatively, the initiation step (block 102) may involve collision detection of first and second vehicles in which the first and second exchangers are disposed (e.g., integrally disposed or positioned). As previously described, the first and second exchangers (or first and second sensors of the first and second vehicles communicatively coupled with the first and second exchangers, respectively) may automatically detect a collision (e.g., by detecting a sudden jolt of the corresponding vehicle). Additionally or alternatively, the initiation step (block 102) may at least in part involve manual initiation, for example, by the first and second users utilizing inputs to the first and second exchange devices (e.g., before or after the proximity and/or collision detections described above). Once the mutually secured information exchange is initiated, the information may be sent from the first exchanger, and from the second exchanger, to an officiating component.

The method 100 also includes receiving (block 104), via the officiating component or device, information to-be-shared from the first exchanger and from the second exchanger. In other words, the officiating component may receive a first data set corresponding with the information to-be-shared sent by the first exchanger, and a second data set corresponding with the information to-be-shared sent by the second exchanger. The first and second data sets may be transmitted to the officiating component over an Internet system, Bluetooth, or the like. As previously described, in some embodiments, the officiating component may be integral with, and split between, the first and second exchangers. However, the description below corresponds in particular with an embodiment in which the officiating component is a component separate from the first and second exchangers.

The method 100 also includes, after receiving the information to-be-shared, analyzing (block 106) the information to-be-shared to determine security compliance (e.g., with the officiating component). Depending on the embodiment, the officiating component may analyze the information to-be-shared to ensure it meets various criteria. For example, the officiating component may ensure that the types of information to be-shared from the first exchanger matches the types of information to-be-shared from the second exchanger. In other words, if the information to-be-shared from the first device includes a user name, an insurance company name, and an insurance policy number, the officiating component may analyze the information to-be-shared from the second device to ensure it includes a user name, an insurance company name, and an insurance policy number. If one device provides more information to-be-shared than another, the officiating component may only share the types of information that match between the two data sets provided by the devices.

Additionally or alternatively, the officiating component may analyze the information to-be-shared to ensure it meets a threshold requirement. In other words, the officiating component may include pre-set threshold requirements (e.g., set prior to a collision, or between a collision and a mutually secured information exchange) that the information to-be-shared must meet in order to complete a mutually secured information exchange. The threshold requirements may require types of information that must be included to complete the mutually secured information exchange. Threshold requirements differ from information matching requirements insomuch as threshold requirements seek to ensure that both the first exchanger and the second exchanger share certain types of information, whereas information matching only requires that the first and second exchangers share the same types of information, regardless of whether the information is comprehensive enough to meet the threshold requirement of the officiating component. In some embodiments, the officiating component may utilize both threshold requirements and information matching requirements. For example, the officiating component may require that both the first exchanger and the second exchanger provide information-to-be-shared that meets threshold requirements, but also will send additional information beyond the threshold requirements if both exchangers provide the additional information beyond the threshold requirements. As previously described, the types of information that may be provided for analysis/transfer may include a name of the corresponding user, a birthdate of the corresponding user, contact information of the corresponding user, a driver's license number of the corresponding user, an automobile insurance policy number of the corresponding user, an automobile insurance company corresponding with the policy number, effective and expiration dates corresponding with the policy number, a make, model, and/or year of the user's vehicle, an identification number of the user's vehicle, or other automobile insurance-related information, or any combination thereof.

The method 100 also includes issuing (block 108) information reports, for example from the officiating component to the first and second exchangers. The information reports may transfer all of the information to-be-shared from the first and second exchangers, may transfer a portion of the information to-be-shared from the first and second exchangers, or may transfer none of the information to-be-shared from the first and second exchangers. For example, in an embodiment in which the coordinating component or device analyzes for threshold requirements and for information matching, the coordinating component or device may transfer all information in the information reports if the analyzed information passes the threshold requirements and both the first and second exchanger provide the same types of information. The coordinating component or device may transfer none of the information if the information to-be-shared from the first exchanger fails to meet the threshold requirements, if the information to-be-shared from the second exchanger fails to meet the threshold requirements, or both. The coordinating component or device may transfer some of the information if the information-to-be-shared from the first and second exchangers meets the threshold requirement, but the types of information provided by the first exchanger differs from those of the second exchanger. These and other of the analysis decisions made by the officiating component or device are described in detail below.

The method 100 also includes filing (block 110) an insurance claim (e.g., automatically filing an insurance claim). For example, as previously described, certain successful exchanges of information between the first and second exchangers 12, 14 may facilitate automatic filing of an insurance claim. Once the information is exchanged, either of the users 13, 15 may utilize the information to file an insurance claim, or either of the exchangers 12, 14 (or officiating component 16) may automatically file an insurance claim with the exchanged information. In embodiments where an insurance claim might be automatically filed, the automatic filing feature may require that certain information was exchanged, similar to the threshold requirement. Indeed, in an embodiment requiring automatic filing of an insurance claim for any exchange of information to occur, the threshold requirement may dictate which types of information are required in order to ensure that the automatic filing of the insurance claim is possible. Further, in some embodiments, an insurance claim may be automatically initiated (e.g., kick-started) with the exchanged information, leaving the rest of the information to be provided by, e.g., the user.

FIG. 5 is a flow chart illustrating a process 200 of analyzing a first data set provided by a first information exchanger, and a second data set provided by a second information exchanger. In the illustrated embodiment, the process 200 includes receiving (block 202), for example by an officiating component, first and second data sets from first and second exchangers, as previously described. The process 200 also includes determining (block 204), via the officiating component, whether the first data set meets a threshold requirement, as previously described. If the first data set fails to meet the threshold requirement (block 206), the officiating component (e.g., officiation device, or another device) may issue an information report to the first and second exchangers notifying the first and second users that no information was exchanged (208).

If the first data set meets the threshold requirement (block 208), the process 200 includes determining (block 206), via the officiating component, whether the second data set meets the threshold requirement, as previously described. If the second data set fails to meet the threshold requirement (block 214), the information report is issued by the officiating component to the first and second exchangers, notifying the first and second users that no information was exchanged (block 208).

If the first and second data sets meet the threshold requirement (block 216), the officiating component determines whether the types of data in the first data set match those of the second data set (block 218). If the information does not match (block 220), the officiating component may issue an information report to the first and second exchangers notifying the first and second users of a partial information exchange (block 222). In other words, the information report will only include the types of information that match.

If the information types in the first data set match those of the second data set (block 224), the officiating component may issue information reports to the first and second exchangers indicating a full exchange. In other words, the information report will include all the information that was analyzed in the steps above. It should be noted that the flow chart 200 illustrates only one non-limiting example of determinations that might be made by the officiating component, and the information reports that result therefrom.

It should also be noted that, if the information exchanged by way of blocks 222 or 226 is sufficient, the process 200 may also include automatic filing of an insurance claim. For example, once the information is exchanged, either of the users may utilize the information to file an insurance claim, or either of the exchangers may automatically file an insurance claim with the exchanged information. Further, in some embodiments, an insurance claim may be automatically initiated (e.g., kick-started) with the exchanged information, leaving the rest of the information to be provided by, e.g., the user.

It should be noted that, for any of the systems and/or processes illustrated in FIGS. 1-5 and described in detail above, any of the following collision detection parts or assemblies may be employed. For example, FIG. 6 is a schematic diagram illustrating various embodiments of vehicle collision detection parts or assemblies suitable for use in the systems of FIGS. 1-3 and processes of FIGS. 4 and 5. FIG. 6 illustrates the first vehicle 50 and the second vehicle 52 during (or following) a collision. As described above, the vehicles 50, 52 may be equipped with features configured to enable detection of the collision, and a mutually secured exchange of insurance related information. The illustrated embodiment focuses on the collision detection features and, thus, considers only the first vehicle 50. However, it should be understood that the second vehicle 52 may include the same or similar collision detection features described with respect to the first vehicle 50 below.

As shown, the collision sensor 54 may be disposed within (or on) the first vehicle 50. In general, the collision sensor 54 may be equipped to detect collision activity, such as vibrations of the first vehicle 50. The collision sensor 54 may detect other collision activity, such as a jerk of the first vehicle 50, an acceleration of the first vehicle 50, a damage to the first vehicle 50, or some other activity. As previously described, processing equipment may analyze sensor feedback/data indicative of the collision activity. The processing equipment may determine whether the detected collision activity (e.g., vibrations) exceed a threshold (e.g., vibration threshold) indicative of a collision. It should be noted that the processing equipment may be separate from the collision sensor 54, or a part of the collision sensor 54.

In accordance with present embodiments, the collision sensor 54 may include one or more components. For example, several options, each option including one or more components, may be effective as the collision sensor 54. Indeed, in some embodiments, a portable electronic device 250, such as a cell phone, may operate as the collision sensor 54. The portable electronic device 250 may be equipped with collision detection software which detects collision activity (e.g., vibrations, jerk, acceleration, damage, etc.) of the portable electronic device 250 and/or vehicle 50. In certain embodiments, the portable electronic device 250 may be capable of detecting a collision (e.g., vibrations indicative of the collision, or some other collision activity) without being coupled to the vehicle 50 in any way.

In another embodiment, the portable electronic device 250 may be coupled to a dongle 252, where the dongle 252 is a separate hardware device plugged into the vehicle 50 (e.g., plugged into a data pathway to a CPU of the vehicle 50), or the dongle 252 is a part of the vehicle 50 and coupled with the data pathway to the CPU. In either case, the dongle 252 may detect the collision (e.g., vibrations indicative of the collision) and transmit data relating to the collision to the portable electronic device 250, which may act as the aforementioned information exchanger (e.g., via Internet connectivity, or some other protocol such as Bluetooth). Additionally or alternatively, another component (e.g., the CPU or a sensor) of the vehicle 50 may detect the collision activity, and the dongle 252 may act as an information conduit between the component of the vehicle 50 and the portable electronic device 250.

In still other embodiments, as shown, the collision sensor 54 may include the dongle 252 without the portable electronic device 250. That is, the dongle 252 may be capable of detecting the collision activity (and/or receiving collision activity data from a component of the vehicle 50, such as the CPU or a sensor, as noted above), and the dongle 252 may be Internet enabled (or Bluetooth enabled, or enabled via some other communication protocol) for communication with other information exchangers and/or officiating components, as described above.

In still other embodiments, other parts/assemblies 254 may be utilized as the collision sensor 54. The collision sensor 54 should not be construed as requiring a single device or requiring more than a single device, and it should be noted that other forms of collision detection are contemplated by the present disclosure. That is, the detection of the collision (e.g., vibrations indicative of the collision) and processing of the corresponding collision data may be carried out by any one or more components equipped to detect collisions and/or process data.

In general, information exchange systems and methods in accordance with the present disclosure reduce uncertainty resulting from automobile accidents or collisions, and reduce the need for law enforcement involvement. Further, the disclosed information exchange systems and methods enhance accuracy of information exchange, and enhance efficiency and speed of information exchange, thereby reducing a burden on other commuters (e.g., traffic), local law enforcement, and other traffic management constituents.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory, computer readable medium comprising computer-executable instructions that, when executed by one or more processors, cause the one or more processors to:
   receive a first data set indicative of first information relating to a first automobile;
   receive a second data set indicative of second information relating to a second automobile;
   compare the first data set and the second data set with one or more data threshold requirements; and
   approve, in response to a determination that the first data set and the second data set meet the one or more data threshold requirements, transmission of the first data set or a first portion of the first data set to a second device associated with the second automobile and the second data set or a second portion of the second data set to a first device associated with the first automobile.

2. The non-transitory, computer-readable medium of claim 1, wherein the computer-executable instructions, when executed by the one or more processors, cause the one or more processors to transmit the first data set or the first portion of the first data set to the second device and the second data set or the second portion of the second data set to the first device based on approval of the transmission.

3. The non-transitory, computer-readable medium of claim 1, wherein the computer-executable instructions, when executed by the one or more processors, cause the one or more processors to receive sensor feedback indicative of a collision between the first automobile and the second automobile.

4. The non-transitory, computer-readable medium of claim 1, wherein the computer-executable instructions, when executed by the one or more processors, cause the one or more processors to receive the first data set from the first device.

5. The non-transitory, computer-readable medium of claim 1, wherein the computer-executable instructions, when executed by the one or more processors, cause the one or more processors to receive the first data set from a database.

6. The non-transitory, computer-readable medium of claim 1, wherein the computer-executable instructions, when executed by the one or more processors, cause the one or more processors to receive the first data set from the first device and from a database.

7. The non-transitory, computer-readable medium of claim 1, wherein the first data set indicative of the first information comprises data indicative of at least one of:
   a name of a driver or owner associated with the first automobile;
   a birthdate of the driver or owner;
   contact information of the driver or owner;
   a driver's license number of the driver or owner;
   an automobile insurance policy number associated with the first automobile;
   an automobile insurance company corresponding with the automobile insurance policy number;
   an effective or expiration date corresponding with the automobile insurance policy number;
   a make, model, or year of the first automobile; or
   an identification number of the first automobile.

8. A non-transitory, computer-readable medium comprising computer-executable instructions that, when executed by one or more processors, cause the one or more processors to:
   determine that a collision occurred between an automobile and an additional automobile;
   receive a data set indicative of information relating to the automobile;
   compare the data set with a data threshold requirement; and
   approve, in response to a determination that the data set meets the data threshold requirement, transmission of the data set or a portion of the data set to a device associated with the additional automobile.

9. The non-transitory, computer-readable medium of claim 8, wherein the computer-executable instructions, when executed by the one or more processors, cause the one or more processors to:
   receive an additional data set indicative of additional information relating to the additional automobile;
   compare the additional data set with the data threshold requirement; and
   approve, in response to an additional determination that the additional data set meets the data threshold requirement, transmission of the additional data set or an additional portion of the additional data set to an additional device associated with the automobile.

10. The non-transitory, computer-readable medium of claim 8, wherein the computer-executable instructions, when executed by the one or more processors, cause the one or more processors to transmit the data set or the portion of the data set to the device.

11. The non-transitory, computer-readable medium of claim 8, wherein the computer-executable instructions, when executed by the one or more processors, cause the one or more processors to receive the data set from a database, an additional device associated with the automobile, or both.

12. The non-transitory, computer-readable medium of claim 8, wherein the computer-executable instructions, when executed by the one or more processors, cause the one or more processors to transmit, in response to an additional determination that the data set does not meet the data threshold requirement, a notification to the device, an additional device associated with the automobile, or both indicating that no information was exchanged.

13. The non-transitory, computer-readable medium of claim 8, wherein the computer-executable instructions, when executed by the one or more processors, cause the one or more processors to initiate an insurance claim in response to approving the transmission of the data set or the portion of the data set to the device, or in response to transmitting the data set or the portion of the data set to the device.

14. The non-transitory, computer-readable medium of claim 8, wherein the data set indicative of the information comprises data indicative of at least one of:
a name of a driver or owner associated with the automobile;
a birthdate of the driver or owner;
contact information of the driver or owner;
a driver's license number of the driver or owner;
an automobile insurance policy number associated with the automobile;
an automobile insurance company corresponding with the automobile insurance policy number;
an effective or expiration date corresponding with the automobile insurance policy number;
a make, model, or year of the automobile; or
an identification number of the automobile.

15. A computer-implemented method, comprising:
receiving, at one or more processors, a first data set indicative of first information relating to a first automobile;
receiving, at the one or more processors, a second data set indicative of second information relating to a second automobile;
comparing, via the one or more processors, the first data set and the second data set with one or more data threshold requirements; and
approving, via the one or more processors and in response to a determination by the one or more processors that the first data set and the second data set meet the one or more data threshold requirements, transmission of the first data set or a first portion of the first data set to a second device associated with the second automobile and the second data set or a second portion of the second data set to a first device associated with the first automobile.

16. The computer-implemented method of claim 15, comprising determining that a collision occurred between the first automobile and the second automobile.

17. The computer-implemented method of claim 16, comprising approving, via the one or more processors, in response to the determination that the first data set and the second data set meet the one or more threshold requirements, and in response to an additional determination that the collision occurred between the first automobile and the second automobile, the transmission of the first data set or the first portion of the first data set to the second device associated with the second automobile and the second data set or the second portion of the second data set to the first device associated with the first automobile.

18. The computer-implemented method of claim 15, comprising receiving, at the one or more processors, the first data set from the first device, a database, or both.

19. The computer-implemented method of claim 15, comprising:
receiving, at the one or more processors, a third data set indicative of third information relating to a third automobile;
receiving, at the one or more processors, a fourth data set indicative of fourth information relating to a fourth automobile;
comparing, via the one or more processors, the third data set and the fourth data set with the one or more data threshold requirements; and
approving, via the one or more processors and in response to an additional determination by the one or more processors that the third data set and the fourth data set do not meet the one or more data threshold requirements, transmission of a notification to a third device corresponding to the third automobile, a fourth device corresponding to the fourth automobile, or both indicating that no information exchange between the third device and the fourth device occurred.

20. The computer-implemented method of claim 15, wherein the first data set indicative of the first information comprises data indicative of at least one of:
a name of a driver or owner associated with the first automobile;
a birthdate of the driver or owner;
contact information of the driver or owner;
a driver's license number of the driver or owner;
an automobile insurance policy number associated with the first automobile;
an automobile insurance company corresponding with the automobile insurance policy number;
an effective or expiration date corresponding with the automobile insurance policy number;
a make, model, or year of the first automobile; or
an identification number of the first automobile.

* * * * *